United States Patent [19]

Buchanan, Jr. et al.

[11] Patent Number: 4,543,839
[45] Date of Patent: Oct. 1, 1985

[54] WINDSHIELD WIPER TRANSMISSION

[75] Inventors: Harry C. Buchanan, Jr., Spring Valley; William R. Mack, Kettering; Jagmohan K. Malhotra, Dayton, all of Ohio

[73] Assignee: General Motors Corporation, Detroit, Mich.

[21] Appl. No.: 570,996

[22] Filed: Jan. 16, 1984

[51] Int. Cl.$^4$ .................. F16H 21/44; F16H 55/17
[52] U.S. Cl. ............................................ 74/98; 74/437
[58] Field of Search ............................ 74/437, 98

[56] References Cited

U.S. PATENT DOCUMENTS

| | | | |
|---|---|---|---|
| 1,142,051 | 6/1915 | O'Connor | 74/437 |
| 2,027,818 | 1/1936 | Golber | 74/437 |
| 2,477,441 | 7/1949 | Cole | 74/437 |
| 2,957,363 | 10/1960 | Ingham et al. | 74/437 |
| 3,098,399 | 7/1963 | Berthiaume | 74/437 |
| 3,208,299 | 9/1965 | Leonard et al. | 74/98 |
| 4,160,389 | 7/1979 | Kubono | 74/98 |

Primary Examiner—Henry C. Yuen
Attorney, Agent, or Firm—Saul Schwartz

[57] ABSTRACT

A transmission for a windshield wiper includes a non-circular pinion gear having a closed pitch curve with a basic elliptical segment and a circular segment and a non-circular output gear having an open pitch curve with a third order elliptical segment and a circular segment. The pinion and the output gears mesh such that the basic elliptical and third order elliptical pitch curve segments roll against each other and the circular pitch curve segments roll against each other so that the gear ratio of the combination varies sinusoidally through a first included angle of output gear rotation and remains substantially constant through a second included angle of output gear rotation.

3 Claims, 5 Drawing Figures

WINDSHIELD WIPER TRANSMISSION

BACKGROUND OF THE INVENTION

1. Field of the Invention

This invention relates generally to vehicle windshield wipers and, more particularly, to a new and improved windshield wiper transmission effecting an advantageous combination of wiper arm drive torque and wiper arm speed.

2. Description of the Prior Art

In most automotive windshield wiper systems, blade carrying wiper arms oscillate across the windshield in arcs of varying dimension about pivot axes adjacent the windshield. Since the arms reverse direction at inner and outer wipe limits, minimum noise and inertia loading are achieved by reducing the angular velocity of the arms as they approach the wipe limits. Conversely, to reduce the duration of each wipe cycle, it is desirable to maximize the angular velocity of the arms. In addition, where ice and snow may be encountered, maximum drive torque at the wipe limits and during initial movement from parked positions of the wiper arms is desirable. In the past, mechanical linkage systems between the arms and a single drive motor have fulfilled some or all of these requirements but at the expense of economy and efficient use of vehicle space. In some recent windshield wiper system proposals separate drive motors and transmissions are provided for each wiper arm with electronic control provided to effect motor reversal at the wipe limits and, in some cases, to even increase the wiping arc when a wider pattern is desired. In these systems, however, the torque mutiplication ratio of the gear transmissions between the motors and the wiper arms is constant so that only by manipulating the motors themselves can variable wiper arm torque and speed be achieved. Finally, another system has been proposed wherein a non-arcuate wiping pattern is achieved through a complicated gear and rotating case arrangement. In this proposed system, uniform wiper blade speed throughout the non-arcuate motion path is achieved with a gear train having a plurality of eccentrically mounted circular gears. A windshield wiper system as disclosed herein represents an improvement over these and other known systems in that it includes a transmission according to this invention which produces a particularly advantageous combination of wiper arm drive torque and angular velocity in a simple and economical structure.

SUMMARY OF THE INVENTION

Accordingly, the primary feature of this invention is that it provides a new and improved transmission for disposition on a vehicle body between a constant torque and constant speed reversible electric motor and a windshield wiper arm whereby the wiper arm is oscillated across a windshield in a wiping arc having inner and outer wipe limits and, at the onset or termination of wiping, through a secondary arc between the inner wipe limit and a parked position. Another feature of this invention resides in the provision in the new and improved transmission of a pair of meshing non-circular gears which effect variable gear ratio torque multiplication and speed reduction with gear ratio being maximum at the inner and the outer wipe limits and substantially throughout the secondary arc while varying sinusoidally to a minimum midway between the inner and the outer wipe limits and with wiper arm angular velocity correspondingly being minimum at the inner and the outer wipe limits and substantially throughout the secondary arc while varying sinusoidally to a maximum midway between the inner and the outer wipe limits. Still another feature of this invention resides in the provision in the new and improved transmission of a pair of meshing non-circular gears including a pinion the pitch curve of which has a basic elliptical segment and a generally circular segment and an output gear the pitch curve of which has a third order elliptical segment and a generally circular segment, the basic and third order elliptical segments cooperating to produce sinusoidal variation of speed and torque multiplication gear ratio between the inner and the outer wipe limits and the generally circular segments cooperating to produce generally constant speed and torque multiplication gear ratio throughout the secondary arc.

These and other features of this invention will be readily apparent from the following specification and from the drawings wherein.

Figure 1:
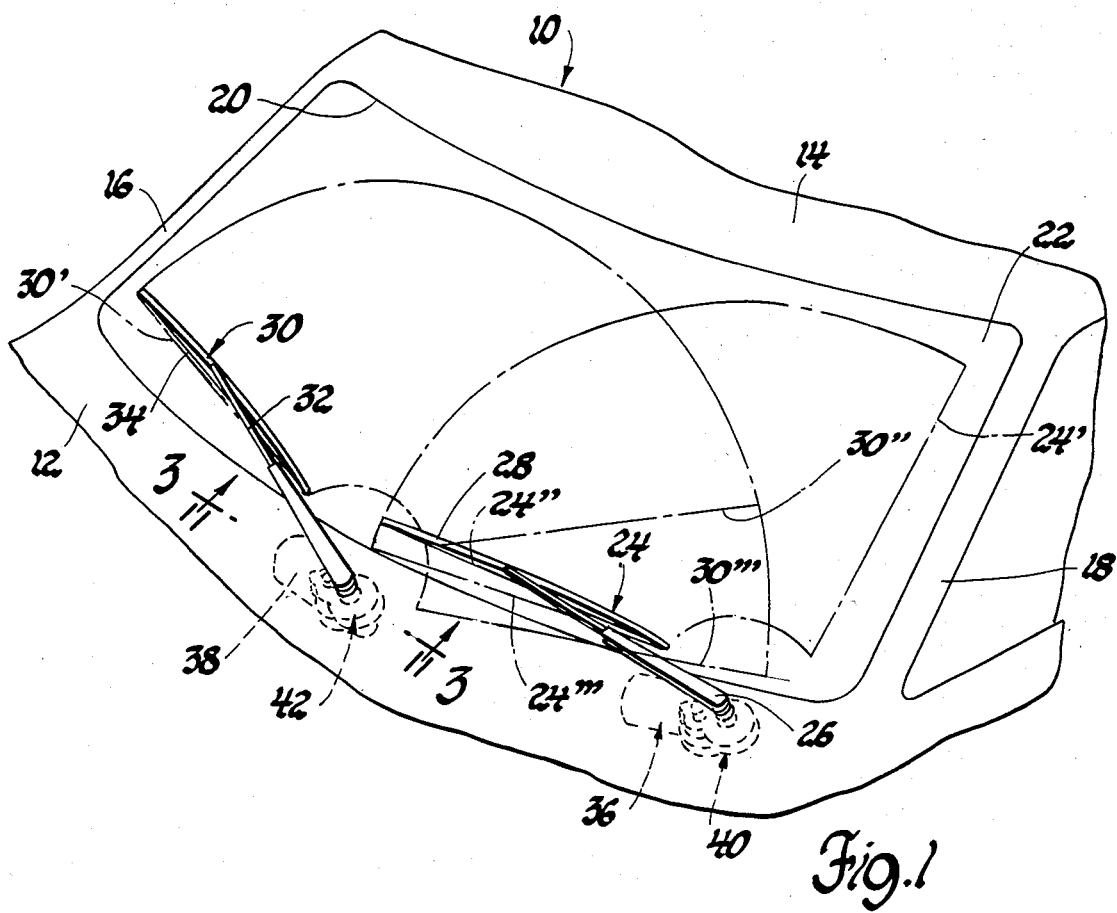
FIG. 1 is a perspective view of a windshield wiper system including a transmission according to this invention showing the wipe limits of wiper arms.
Figure 2:
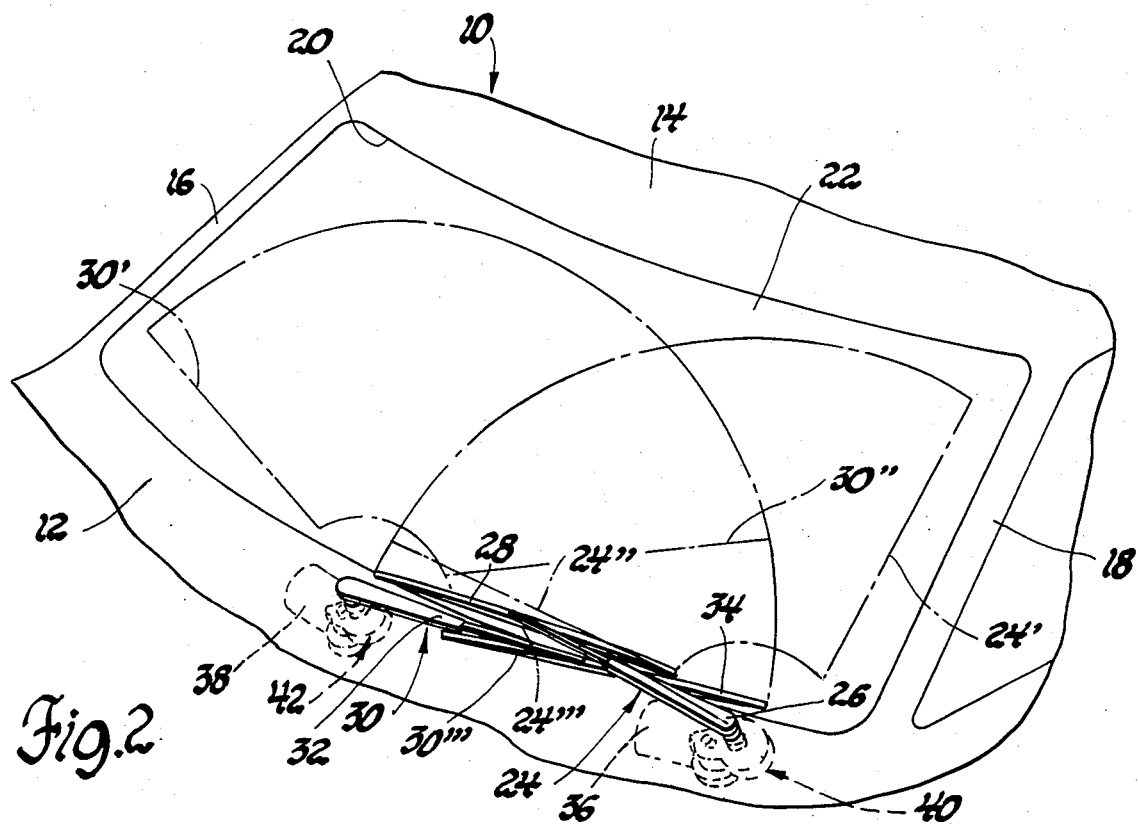
FIG. 2 is a view similar to FIG. 1 but showing the wiper arms in parked positions.

Referring now to FIGS. 1 and 2 of the drawings, a schematically illustrated automobile vehicle body 10 includes a cowl 12, a roof 14, and a pair of laterally spaced front pillars 16 and 18 interconnecting the roof and the cowl. The pillars cooperate with the roof and the cowl in defining a generally rectangular, swept-back windshield opening 20 in which is disposed a conventional glass windshield 22. A driver's side windshield wiper assembly 24 consisting of a wiper arm 26 and an attached wiper blade 28 is supported on the body 10 for pivotal movement across the windshield through a wiping arc having an outer wipe limit designated 24' and an inner wipe limit designated 24" and through a secondary arc from the inner wipe limit 24" to a parked position 24'''. A passenger side windshield wiper assembly 30 including a wiper arm 32 and an attached wiper blade 34 is supported on the body 10 for pivotal movement through a wiping arc having an outer wipe limit 30' and an inner wipe limit 30" and through a secondary arc between the inner wipe limit 30" and a parked position 30'''. A pair of constant speed constant torque reversible electric motors 36 and 38 are connected to corresponding ones of the wiper assemblies 24 and 30 through a pair of transmissions according to this invention and designated 40 and 42, respectively.

Because the transmissions 40 and 42 are identical, except as noted hereinafter, the invention may be adequately understood from a description of only the passenger side transmission 42. Accordingly, with reference to FIGS. 3 and 4, the motor 36 has a schematically illustrated armature shaft 48 on which is formed a worm and which projects into a first housing portion 50 of the transmission 42 rigidly attached to the motor case. A worm wheel 52 engages the worm on the armature shaft 48 and is attached to a support shaft 54 journalled in a sleeve bearing 56 on the first housing portion 50 for rotation on an axis 57 of the transmission. The worm wheel cooperates with the worm on the armature shaft 48 in effecting first stage fixed gear ratio torque multiplication and corresponding speed reduction in either direction of rotation of the armature shaft.

Figure 3:
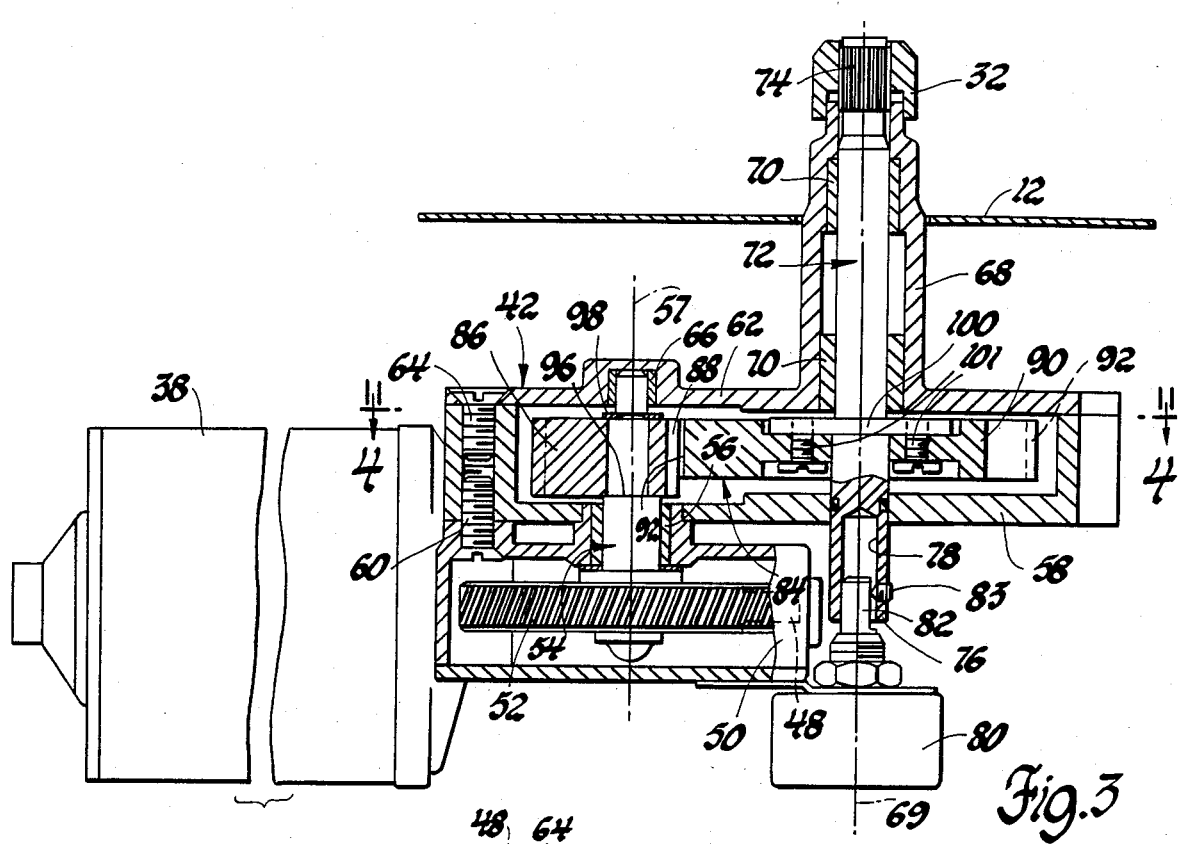
FIG. 3 is an enlarged sectional view taken generally along the plane indicated by lines 3—3 in FIG. 1.
Figure 4:
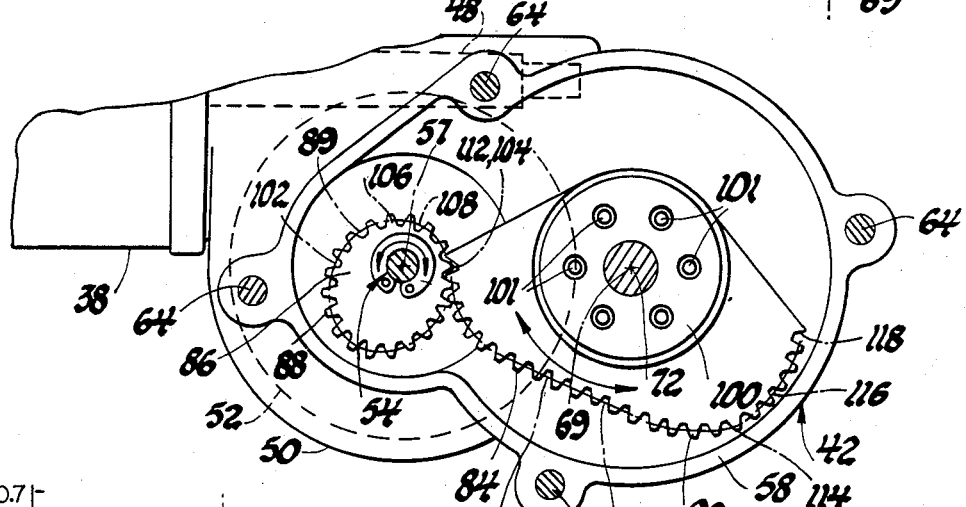
FIG. 4 is a view taken generally along the plane indicated by lines 4—4 in FIG. 3.

With continued reference to FIGS. 3 and 4, a second housing portion 58 of the transmission 42 is rigidly attached to the first housing portion 50 by a plurality of machine screws, only a single screw 60 being shown in FIG. 3. A cover 62 is rigidly attached to the second housing portion 58 by a similar plurality of machine screws 64 and carries a sleeve bearing 66 which rotatably supports the distal end of support shaft 54 on the cover. The cover 62 includes a generally cylindrical barrel 68 which defines an axis 69 parallel to axis 57 and in which a pair of spaced sleeve bearings 70 support an output shaft 72 for rotation on axis 69. The output shaft 72 has a knurled first end 74 projecting out of the barrel 68 and a second end 76 projecting from the opposite end of second housing portion 58 with a bore 78 therein. The hub or inboard end of wiper arm 32 is pressed on the knurled end 74 of the output shaft 72 for rotation as a unit therewith about axis 69. A rotary potentiometer 80 is supported on the first housing portion 50 with a shaft 82 thereof projecting into the bore 78. The potentiometer shaft 82 is coupled to the output shaft 72 for rotation as a unit therewith by a set screw 83 on the output shaft.

A gear set 84 in second housing portion 58 includes a non-circular pinion 86 having a plurality of gear teeth 88 defining a pitch curve 89 around the pinion. The gear set 84 further includes a non-circular output gear 90 having a plurality of gear teeth 92 on an edge thereof defining a pitch curve 94 along the edge. The pinion 86 is mounted on the support shaft 54 within the second housing portion 58 for rotation as a unit with the support shaft, the pinion being captured between a shoulder 96 and a retaining ring 98 on the support shaft. The output gear 90 is rigidly attached to a flange 100 on the output shaft 72 by a plurality of screws 101. The output gear teeth 92 mesh with pinion gear teeth 88 to effect a second stage of gear reduction characterized by variable gear ratio torque multiplication and speed reduction.

The configuration of the toothed periphery of the pinion 86 and the toothed edge of the output gear 90, as well as the gear ratio of the gear set 84 and the angular velocity of the output shaft 72, can and hereinafter will be described in terms of pitch curve configuration and rolling contact between the pitch curves. Accordingly, and with particular reference to FIG. 4, the pinion pitch curve 89 has a first segment 102 extending clockwise from a point 104 to a point 106 and a second segment 108 extending clockwise from point 106 to point 104. The first segment 102 is a portion of a basic ellipse with a focus located generally at the axis 57 on which the support shaft rotates. The second segment 108 is an arc of a circle centered generally on the axis 57. Similarly, the output gear pitch curve 94 has a first segment 110 extending from a first end 112 of the curve to an intermediate point 114 and a second segment 116 extending from the intermediate point 114 to a second end 118 of the curve. The first segment 110 is a portion of a third order ellipse centered generally at the axis 69 on which the output shaft 72 rotates. The second segment 116 is an arc of a circle centered generally at the axis 69. At assembly of the transmission 42, the pinion and output gear are mated as shown in FIG. 4 such that when the wiper assembly 30 is at the outer wipe limit 30' the first end 112 of output gear pitch curve 94 registers with point 104 on the pinion pitch curve 89.

With respect, now, to the operation of transmission 42, the potentiometer 80 is connected to a voltage source, not shown, and provides a voltage signal representative of the exact angular position of the output gear 90, the output shaft 72, and the attached arm 32 of the wiper assembly 30. The potentiometer signal is fed to a conventional electronic control, not shown, which is connected to the voltage source and to the motor 36. During normal wiping operation, the electronic control, sensing the position of the wiper arm 32 through potentiometer 80, reverses the direction of rotation of the motor 36 each time the motor rotates the armature through a first included angle corresponding to movement of the wiper assembly between the inner and outer wipe limits 30" and 30'. When conditioned in either "on" or "off" modes, the electronic control energizes the motor to rotate the armature in opposite directions through a second included angle corresponding to movement of the wiper assembly through the secondary arc to or from the parked position in accordance with whether the system is being turned on or off. The motor 36 and the worm and worm shaft cooperate to provide a constant speed and constant torque input to the gear set 84 during normal wipe operation and during movement of the wiper assembly to and from the parked position.

During the normal wipe cycle, the pinion 86 rotates counterclockwise from the position shown in FIG. 4 corresponding to the outer wipe limit 30' of the wiper assembly through an included angle corresponding to the length of first segment 102 of the pitch curve 89 with corresponding clockwise rotation of the output gear 90 through an included angle corresponding to the length of first segment 110 of the pitch curve 94. Assuming, arbitrarily, that the middle of the wiping arc between the inner and outer wipe limits 30" and 30' represents zero degrees of output gear and wiper arm displacement and that the clockwise direction, FIG. 4, represents positive displacement, the outer wipe limit is located at about $-60°$ and the inner wipe limit is located at about $+60°$ of displacement and the included angle of output gear oscillation and of the wiping arc is about 120°. In effect, then, the relation between the pinion 86 and the output gear 90 during oscillation of the latter between $-60°$ and $+60°$ is that of a basic ellipse, first segment 102 of the pinion pitch curve 89, driving a third order elliptical gear, first segment 110 of the output gear pitch curve 94. The result is a sinusoidal variation of the gear or torque multiplication ratio of gear set 84 from maximum at the inner and outer wipe limits 30" and 30' to minimum at the center of the wiping arc corresponding to 0° of output gear displacement and corresponding variation in wiper arm angular velocity from minimum at the inner and outer wipe limits 30" and 30' to maximum at 0° of output gear displacement. The gear or torque multiplication ratio of gear set 84 is graphically illustrated in FIG. 5 as a function of output gear displacement where a curve 120 describing the relationship of the reciprocal of gear or torque multiplication ratio (ordinate) to output gear displacement (abscissa) has a sinusoidal portion 122 between $-60°$ and $+60°$ of output gear displacement.

Figure 5:
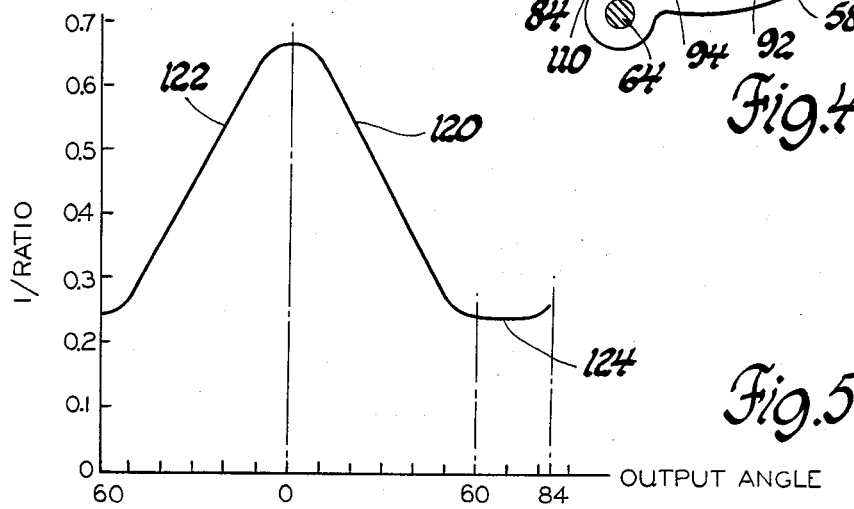
FIG. 5 illustrates the relationship of the reciprocal of torque multiplication gear ratio to output gear position for a windshield wiper transmission according to this invention.

When the electronic control is conditioned to the "off" mode, counterclockwise rotation of the pinion 86 corresponding to movement of wiper assembly 30 toward the inner wipe limit 30" continues beyond registry of point 106 on pinion pitch curve 89 with intermediate point 114 on output gear pitch curve 94 until second end 118 on the output gear pitch curve 94 contacts pinion pitch curve 89. At that instant the wiper assembly 30 achieves the parked position 30''' and the motor is deenergized. During movement of the wiper assembly in the secondary arc the second pitch curve segments 108 and 116 roll against each other with the effect being that of a circular pinion, second segment 108 of pinion pitch curve 89, driving a larger circular gear, second segment 116 of output gear pitch curve 94. The result is generally constant gear or torque multiplication ratio and constant speed reduction through the secondary arc. Because the second segment 108 of the pinion pitch curve 89 blends with the first segment 102 at points 104 and 106, and because the second segment 116 of output gear pitch curve 94 blends with first segment 110 at intermediate point 114, which blends thus occur at points of maximum gear ratio, the gear or torque multiplication ratio of the gear set 84 through the secondary arc is likewise maximum. In FIG. 5, this relationship is graphically represented as a generally flat portion 124 of curve 120 between about +60° and about +84° of output gear displacement. In the reverse direction, when the electronic control is conditioned in the "on" mode, the effect is the same except that maximum gear or torque multiplication ratio occurs as the wiper arm moves through the secondary arc from the parked position thereby maximizing the available torque for overcoming ice or snow buildup on the wiper assembly.

While the output gear 90 rotates about axis 69 through an included angle of about 144°, pinion 86 rotates through an included angle exceeding 360°. In addition, due to practical design and gear manufacturing considerations, the pinion pitch curve segments 102 and 108 and the output gear pitch curve segments 110 and 116 blend gradually. Accordingly, it is not practically possible to produce a gear set for a windshield wiper transmission wherein the flat portion 124 of the curve 120 is perfectly flat throughout the secondary arc. Thus, flat portion 124 exhibits a slight decrease in gear or torque multiplication ratio over about the final 10° of output gear displacement corresponding to rotation of the pinion beyond 360°. The decrease is, however, negligibly small so that for all practical purposes the gear or torque multiplication ratio of gear set 84 is maximum and constant throughout the secondary arc.

It is understood, of course, that the foregoing description of the structure and operation of transmission 42 applies equally to the transmission 40 on the driver's side. However, because the wiping arc and the secondary arc on the driver's side may differ from the corresponding ones on the passenger side, it may be necessary, within the scope of this invention, to adjust the relative lengths of first and second pitch curve segments for both the pinion and the output gear to achieve the desired combination of torque multiplication and speed reduction.

The embodiments of the invention in which an exclusive property or privilege is claimed are defined as follows:

1. In a windshield wiper transmission between a wiper assembly pivotable through a wiping arc having an outer wipe limit and an inner wipe limit and through a secondary arc between said inner wipe limit and a parked position and a constant speed constant torque electric motor rotatable in opposite directions through a first included angle corresponding to said wiping arc and through a second included angle corresponding to said secondary arc, the combination comprising, an output shaft rotatable as a unit with said wiper assembly about a first axis of said transmission, a support shaft rotatable about a second axis of said transmission, fixed gear ratio gear means between said motor and said support shaft operative to rotate the latter in directions and through included angles corresponding to the direction of rotation and included angles of said motor, and variable gear ratio gear means between said support shaft and said output shaft operative to rotate the latter and said wiper assembly through said wiping arc during rotation of said motor through said first included angle with said gear ratio varying sinusoidally from maximum at each of said inner and said outer wipe limits to minimum midway therebetween and through said secondary arc during rotation of said motor through said second included angle with said gear ratio remaining substantially constant at said maximum gear ratio throughout said secondary arc.

2. The combination recited in claim 1 wherein said variable gear ratio gear means includes a pinion rotatable with said support shaft defining a closed pitch curve including a basic elliptical segment and a circular segment and an output gear rotatable with said output shaft defining an open pitch curve including a third order elliptical segment and a circular segment.

3. In a windshield wiper transmission between a wiper assembly pivotable through a wiping arc having an outer wipe limit and an inner wipe limit and through a secondary arc between said inner wipe limit and a parked position and a constant speed constant torque electric motor rotatable in opposite directions through a first included angle corresponding to said wiping arc and through a second included angle corresponding to said secondary arc, the combination comprising, an output shaft rotatable as a unit with said wiper assembly about a first axis of said transmission, a support shaft rotatable about a second axis of said transmission parallel to said first axis, a worm shaft rotatable by said motor, a worm gear rigidly attached to support shaft and engaging said worm shaft whereby said worm gear and said worm shaft define fixed gear ratio gear means operative to rotate said support shaft in directions and through included angles corresponding to the direction of rotation and included angles of said motor, a non-circular pinion gear rigidly attached to said support shaft defining a closed pitch curve including a basic elliptical segment and a circular segment, and a non-circular output gear rigidly attached to said output shaft defining an open pitch curve including a third order elliptical segment and a circular segment, said pinion and said output gears engaging with said basic elliptical pitch curve segment rolling against said third order elliptical pitch curve segment during rotation of said motor through said first included angle so that the gear ratio between said pinion and said output gear varies sinusoidally from maximum at each of said inner and said outer wipe limits to minimum midway therebetween and with said pinion pitch curve circular section rolling against said output gear pitch curve circular segment during rotation of said motor through said second included angle so that the gear ratio between said pinion and said output gear remains substantially constant at said maximum gear ratio throughout said secondary arc.

* * * * *